United States Patent Office 3,439,041
Patented Apr. 15, 1969

3,439,041
OXIDATION PRODUCT SEPARATION
Werner Gey, Offenbach, and Hans Dieter Hofmann, Dornigheim, Germany, assignors to Vickers-Zimmer Aktiengesellschaft Planung und Bau von Industrieanlagen, Frankfurt am Main, a corporation of Germany
Filed Feb. 1, 1966, Ser. No. 524,206
Claims priority, application Germany, Jan. 30, 1965, 211,299
Int. Cl. C07c 45/24, 29/30, 27/32
U.S. Cl. 260—586          4 Claims

ABSTRACT OF THE DISCLOSURE

Method for the recovery of cyclohexanol and cyclohexanone from oxidation reaction products containing these components togethed with water, cyclohexane, biproduct acids and esters of cyclohexanol which includes the improvement of separating the water of reaction containing the adipic acid from the organic phase, thereafter neutralizing the organic phase by treatment with a dilute aqueous caustic solution which is insufficient to cause saponification of esters, treating the neutral reaction product by distillation to remove cyclohexane. cyclohexanone and cyclohexanol from the mixture and treating the remaining mixture with caustic in the substantial absence of cyclohexanone to saponify the remaining esters and recover additional cyclohexanol from the mixture.

Figure 1:
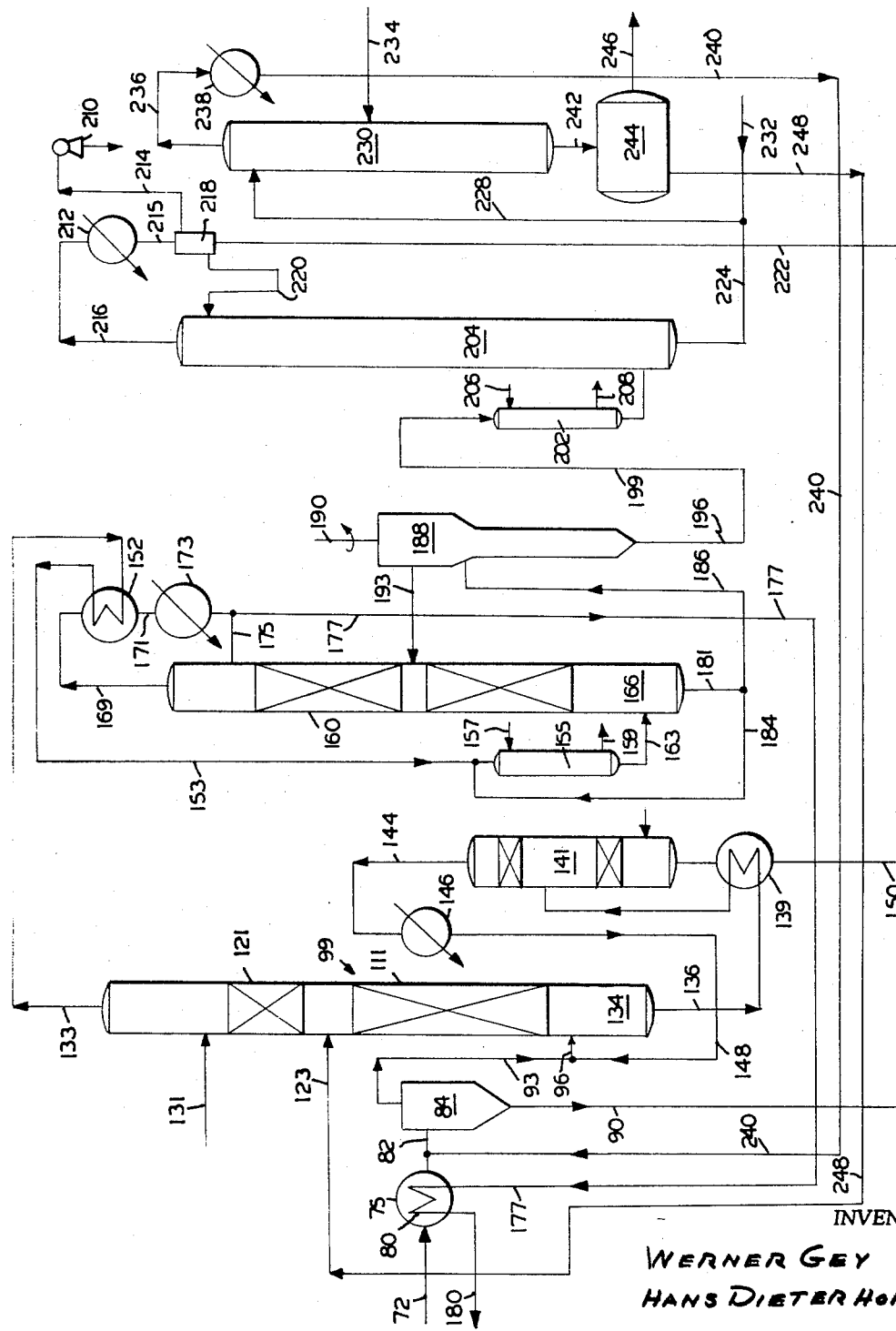

The present invention relates, in general, to treatment of the prodoct of liquid phase partial oxidation of cyclohexane and, in particular, to an improved process for removing unwanted byproducts from the partial oxidation product. It is now well established in the art that processes for the oxidation of cyclohexane constitute an important phase in the manufacture of nylon intermediates such as adipic acid which is subsequently copolymerized with hexamethylene diamine to produce a polyamide capable of being spun into a fiber having certain desirable characteristics. To a great extent, it has been shown and it is now realized that the purity of the nylon intermediates exerts a considerable effect upon the qualities of said fibers.

Considerable attention has been devoted to development of oxidation procedures which provide a high yield of the desired adipic acid in a substantially pure state, and two-step processes have been increasingly favored. In one such process cyclohexane is oxidized with air under conditions suitable to yield a mixture of cyclohexanol and cyclohexanone at a low conversion per pass, followed by separation of these intermediates from cyclohexane which is recycled to the oxygen-gas contact. The cyclohexanol-cyclohexanone mixture, called anolone, is passed to the second oxidation step where it is contacted with nitric acid for conversion to adipic acid. This oxidation of cyclohexane at temperatures above 140° C. with air or other oxygen-contained gases gives a number of liquid oxidation byproducts, such as dicarboxylic acids with a chain length of 2 to 6 carbon atoms and monocarboxylic acids, aldehydes, primary aliphatic alcohols, esters of cyclohexanol with mono- and dicarboxylic acids, polymers of cyclohexanone, etc. To obtain a high yield of valuable oxidation products, the cyclohexane is only partially oxidized, to give a reaction mixture of cyclohexane which contains about 5 to 12 mole percent of oxidation products.

The recovery of every bit of worthwhile materials from this oxidation reaction product is a consistent challenge which the art has met with varying degrees of success. The primary aim of processes for working up this reaction product is, of course, the separation, in high purity, with high yields, of cyclohexanone and cyclohexanol. In addition, adipic acid is desirably recovered from the reaction mixture and it usually is considered advantageous to break down cyclohexanol esters to add to the yield of this alcohol.

A number of methods are known for obtaining high yields of cyclohexanol by treating the reaction product, freed of cyclohexane, with aqueous sodium hydroxide solutions or sodium carbonate solutions to saponify 2 to 6% of the cyclohexyl esters therein contained. For example, see German Patents 1,125,917, 1,150,070, 1,153,361 and 1,155,121. Other methods, for example, as disclosed in German Patent 1,046,610, provide for a washing of the reaction product with water between the single stages and after the last stage of a multi-stage oxidation process and finally for a washing of the reaction product with an aqueous alkaline solution at temperatures of 90° C. to separate the free acids and esters. However, cyclohexanone has a tendency toward self-condensation, a reaction catalyzed by acids or bases which can be initiated also by thermal effects. Such self -condensation during working-up of the oxidation mixture leads to substantial losses in cyclohexanone. The higher polycondensation products accumulate during later distillation as waste residue. Thus, it is a disadvantage of these methods that cyclohexanone is converted by self-condensation and lost.

Furthermore, the adipic acid contained in the oxidation product is dissolved by water and the alkaline solution in these known processes and accumulates in a diluted solution of various mono and dicarboxylic acids which is hard to work up, or as a waste solution of various alkali salts. As is known, the cyclohexyl esters require heavy saponification for complete disassociation of thes substances.

In this invention, it has been found that losses of adipic acid and anolone components may be materially reduced if separate procedures are employed for (1) adipic acid separation from the oxidation reaction product; (2) neutralization of acid byproducts, and (3) saponification of cyclohexanol esters in the absence of cyclohexanone. Thus, this invention includes a series of aqueous wash procedures which may be applied to the cyclohexane oxidation product or portions thereof to clean out the byproducts from the desired anolone and to separate the anolone from unreacted cyclohexane. It was found possible to obtain the adipic acid product dissolved in water by cooling the reaction mixture to separate out an aqueous phase. This aqueous phase comprises mostly water of reaction contained in the original primary oxidation product but it also often may contain water used to form azeotropes with desired components of the stream in later stages of the process. Almost all the adipic acid formed by oxidation is dissolved in this water in high concentration and fairly high purity. The adipic acid may be crystallized out by further cooling the soluton.

It was found, furthermore, that losses in cyclohexanone and cyclohexanol during later, higher temperature procedures such as distillation of the reaction mixture, are appreciably lower if the reaction mixture is in a neutral or near-neutral condition during these later stages. Thus, the reaction product is washed in a diluted alkaline solution prior to separation of the cyclohexane, for the purpose of removing only the acids dissolved in the reaction mixture without saponification of the esters of cyclohexanol. Waste alkali from the later saponification, it has been found, may conveniently be used for this dilute alkali treatment. After treatment with alkali, the reaction product should have an acid number of less than 0.5, preferably 0.1, but not be basic. The cyclohexanone contained in the reaction mixture shows no tendency to self-condensation during this mild alkali wash, and yields in the subsequent distillation are almost quantitative. Since the processing method of this invention requires no long-term treatment of the reaction product with concentrated alkali-hydroxy or -carbonate solutions at temperatures between 80° and 100° C., as is otherwise demanded by the conventional saponification of the cyclohexyl esters, no cyclohexanone is lost by self-condensation during the short-term washing of the reaction product. The cyclohexanone and cyclohexanol which may dissolve in the wash solution can be distilled off under heat from an almost neutral solution as an azeotropic mixture with water and returned to the process.

Distillation methods are used for separation of the remaining organic components. Cyclohexane may be initially distilled off to give a crude mixture of cyclohexanone and cyclohexanol with 5 to 20% of cyclohexane. This cyclohexane may be returned to the oxidation reaction. Preferably, distillation equipment is used which insures short retention times for the product. Thin film rectifiers, spray towers with falling film evaporators, etc., may advantageously be employed. In a second distillation column, the rest of the cyclohexane generally is removed under vacuum from the crude cyclohexanone-cyclohexanol and can be returned to the preceding rectifier. In a third distillation stage, cyclohexanone and cyclohexanol which contain minor quantities of esters with the same boiling point are topped under a vacuum between 5 and 10 Torr. If this anolone mixture is to be separated into its components, it may be subjected to catalytic dehydrogenation to split the esters. For oxidation to adipic acid the anolone components need not be separated but the mixture itself is withdrawn as product.

The residue of the third distillation stage desirably is free of cyclohexanone. Traces of this which may appear are advantageously removed by azeotropic distillation with water. In this distillation cyclohexanol also may be removed as an azeotrope. The remaining components of the residue are subjected, pursuant to this invention, to saponification with aqueous alkaline solution, preferably at about its boiling temperature, say about 80–100° C. During the saponification, cyclohexanol released from the esters is distilled off continuously as an azeotropic mixture with water. The azeotropic mixtures may be returned to the aqueous separation stage. Saponification usually uses aqueous alkali of 10–25 or more percent concentration and may take about ½ to 3 hours. On completing saponification, the heavy, oily, cyclohexanol-free organic residue may be separated from the excess aqueous alkaline solution. The aqueous alkaline solution may then be fed to the prior alkali wash step of the invention.

The process of this invention is particularly useful with an oxidation procedure not being prior art in which cyclohexane is converted by feeding it to a reaction zone wherein it is contacted with molecular oxygen-containing gas at a plurality of separate points in its flow through the reaction zone to provide for a controlled oxygen content which varies in the reaction mixture in various parts of the reaction zone. Conversion of cyclohexane is restricted to about 4.0 to 15.0 percent, and optimum results are obtained when about 0.05 to 0.20 mole of oxygen is introduced per mole of cyclohexane. The residence time of cyclohexane in the reaction zone is about 5–30 minutes and the reaction preferably takes place in the liquid phase under boiling conditions of temperature and pressure. Usually a temperature of about 150–180° C. is employed. The reaction often uses a catalyst; for example, a cobalt compound.

As mentioned, after removal from the oxidation reaction, the product is passed to a settling zone for removal of the water of reaction. The mixture of partially oxidized material unreacted cyclohexane is cooled to about 100° C., say to about 50–120° C., to insure that water present in the mixture will be in the liquid phase and no further water is added to the product at this time. The water together with acids and other water-soluble components from the product stream settles out. Among these components is adipic acid in a quantity sufficient to warrant recovery. This aqueous phase is sent to an adipic acid recovery system which may well be the recovery system which treats the product of a subsequent anolone-nitric acid reaction. The organic phase resulting from this separation, as mentioned, is contacted with caustic solution and an aqueous wash for removal of inorganic and other water-soluble materials, such as soaps, etc., present in the caustic-treated liquid product. The organic phase enters the caustic treatment zone at a temperature of, say about 50–100° C., at a pressure at least sufficient to maintain the liquid phase and counter-current contact may desirably be used. The concentration of the caustic, which usually is sodium hydroxide, although suitable potassium compounds may also be employed when feasible, is about 3–10%, say about 6%, when introduced and is used in the amount of about one part caustic solution for each 5–20, preferably 10–15, parts by volume of the organic phase.

After caustic contact, the organic phase is washed with water at about the same temperature. One part of volume of the water may be used per about 7–22, preferably about 10–17 volumes of organic liquid. This double wash serves to break down and/or remove remaining acids and esters contained in the first stage oxidation effluent and serves to prevent free caustic and soaps from going with the organic liquid contained in the effluent of the caustic washing stage. Both of these contact steps are conveniently conducted in elongated vertically disposed towers packed with inert contact solids such as Raschig rings. The aqueous phases removed from these treatments also carry with them some anolone and, advantageously, these wash effluents are combined and treated for anolone recovery, for example, by distillation. It has been found preferable to conduct both caustic and water wash steps in a single tower, feeding the organic material to a lower portion of the tower and removing the treated organic material from near the top of the tower. Water is fed to the top of the tower and caustic to a midsection of the tower. The combined wash effluents thus may be drawn from the bottom of the tower and the wash water may serve for further dilution of the caustic in the caustic wash treatment.

Figure 2:
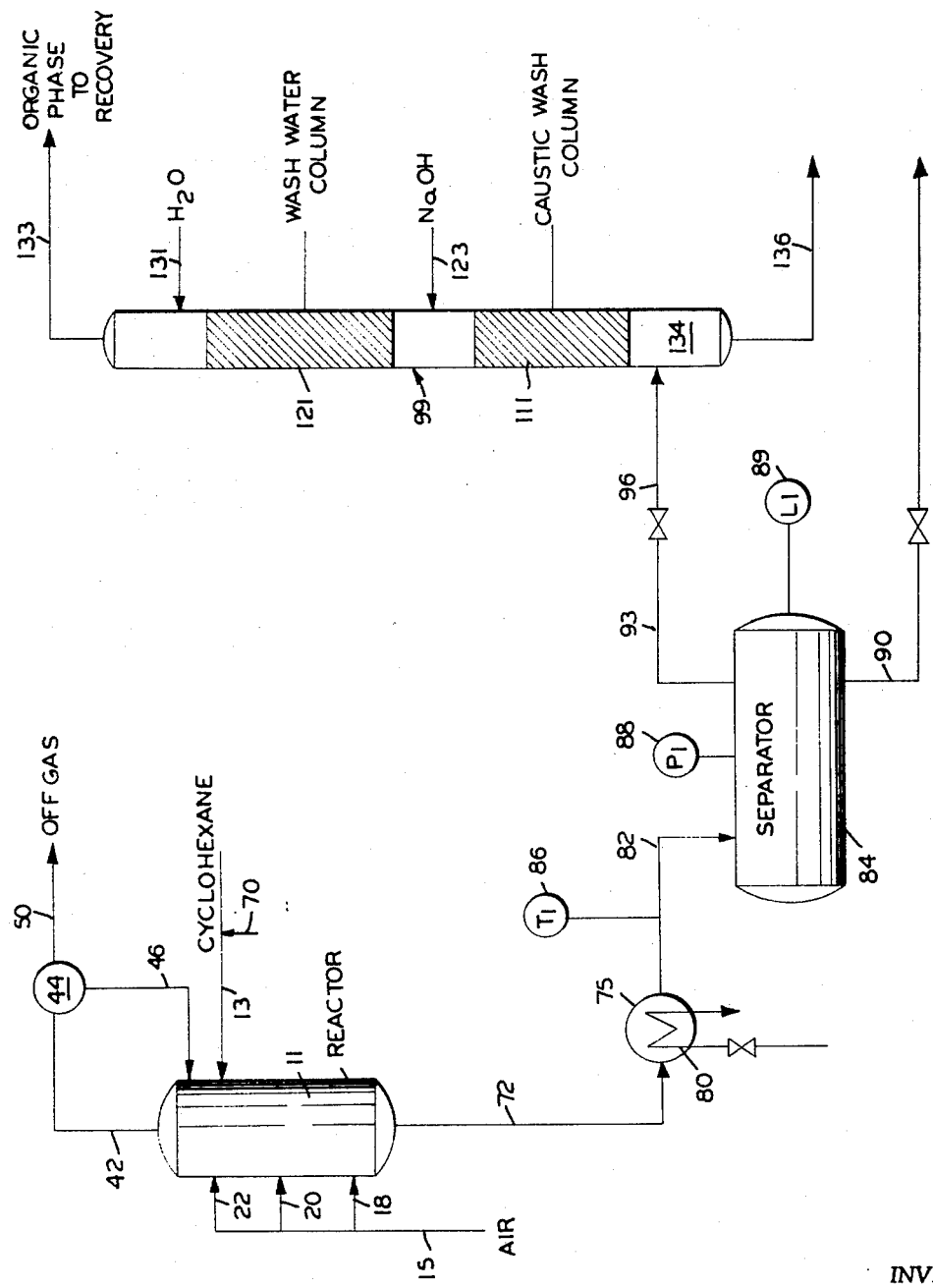

The invention will be better understood by reference to the accompanying drawings, in which FIGURE 1 is a flow sheet of an anolone manufacture and recovery procedure; and FIGURE 2 is an enlarged schematic presentation of the treatment steps prior to distillation.

Turning first to FIGURE 2, 11 is a reactor wherein cyclohexane, entering by way of line 13, is subjected to countercurrent contact with air which is supplied by line 15 through lines 18, 20, 22. These lines define three oxidation stages in the reactor. Unreacted gases, containing cyclohexane vapors, leave reactor 11 by way of line 42. In condenser 44, normally liquid components are converted back to liquid form for return by line 46 to the reactor 11. Off gases leave by line 50. If desired, catalyst may be supplied to the reaction in a solution from line 70.

Reaction product leaving the bottom of reactor 11 by line 72 may pass through heat exchanger 75 to cool the reaction product by indirect contact with cooling fluid in coil 80. Cooled reaction product mixture is carried by line 82 to quiescent settler 84. If desired, line 82 may be provided with temperature indicator 86 while separator 84 may have the pressure indicator 88 and level indicator 89. The heavier aqueous phase which settles out of the oxidation reaction product may be drawn off by line 90 to an adipic acid recovery procedure. The organic phase, which comprises mostly cyclohexane, carries with it the anolone and a number of byproducts including acids, esters, etc. This phase passes by lines 93 and 96 (see FIGURE 1) for introduction to the wash column 99. This line may be conveniently be located in a lower portion of the column. The column 99 is, in effect, two wash columns placed one above the other, the lower portion 111 comprising a caustic wash zone and the upper portion 121 comprising a water wash zone. In the lower zone 111, the organic phase to be washed passes upwardly in counter-current contact with downwardly flowing sodium hydroxide solution. The caustic is introduced as an about 6% solution at about the midpoint of column 99 by line 123. After its contact with the caustic solution, the organic phase passes through the water wash section 121 in counter-current contact with water introduced by line 131. After the water wash, the organic phase, freed of water-soluble constituents, passes out of the column 99 by line 133. The washing water, passing downwardly through section 121, as mentioned, dissolves out water-soluble materials from the organic phase and also carries with it some anolone components. When it enters section 111 this water serves to dilute the caustic solution being introduced by line 123, providing more solvent medium for the dissolution of slightly water-soluble components of the organic phase. The diluted caustic, containing solubles, gathers at the bottom 134 of column 99 and is drawn off by line 136. As shown, line 136 may pass through heat exchanger 139 to distillation column 141. In the distillation column 141, cyclohexane, cyclohexanone and cyclohexanol components may be distilled off as azeotropic mixtures with water, returning by way of line 144, condenser 146 and line 148 to the line 96 and wash column 99. Excess water in the distillation column 141, carrying salts of organic acids passes out of the system by heat exchanger 139 and line 150, usually to waste. Washed cyclohexane-anolone mixture passes by line 133 by way of heat exchanger 152 and line 153 to the evaporator 155 which as mentioned, may be a falling film evaporator, provided with a heat-exchange fluid by lines 157 and 159. The vaporized organic phase passes to column 160 by line 163. In this column the major portion of the cyclohexane passes through as a vapor while anolone components and impurities condense and collect at the bottom 166 of the column 160. Cyclohexane vapors pass from the top of column 160 by line 169 to heat exchanger 152 for partial cooling, and thence by line 171 to condenser 173. A portion of the cyclohexane is returned as reflux to column 160 by water seperator 174 and line 175 while the rest passes by line 177 through coil 80 of heat exchanger 75 to line 180. The separated water is given by line 176 to waste. Conveniently, this line may be attached to line 13 for recycle of the cyclohexane to the primary oxidation reaction.

The mixture of cyclohexane, anolone and impurities which collects at the bottom 166 of column 160 passes out by line 181. From this line a portion may be recycled by line 184 to the evaporator 155. The balance is treated for recovery of usable components by passage through line 186 to the thin film rectifier 188 which may be provided with the stirrer 190. Cyclohexane may be removed from the top of this column by line 193 for recycle to the previous column.

Anolone components and impurities pass from the bottom of rectifier 188 by lines 196 and 199 to the evaporator section 202 of distillation column 204. The evaporator is supplied with heat exchange fluid by lines 206 and 208 The distillation column 204 is held under reduced pressure by vacuum from pump 210 operating through condenser 212 and lines 214, 215 and 216. Anolone component vapors pass out of column 204 by way of line 216 to condenser 212. Line 215 carries the condensate to surge tank 18. Part of this condensate may be returned to column 204 as reflux by line 220 while the major portion is removed as product from the system by line 222.

At the bottom of column 204 some cyclohexanol and cyclohexanone, carrying impurities such as cyclohexanol esters accumulate. This material is carried by lines 224 and 228 to saponification column 230. Also, water from line 232 may be passed to the material in line 228. The column 230 is preferably a cascade-type column which is held at boiling conditions. Thus, in the upper portion of the column the anolone-impurity mixture is boiled with water and in the lower portion is boiled in admixture with concentrated caustic introduced through line 234. Anolone components are boiled off as an azeotrope with water and exit by line 236 to condenser 238. The condensed mixture passes by line 240 back to the midsection of the wash column 134.

Also, in the lower portion of wash column 230 cyclohexanol esters are saponified. The resulting soaps, mixed with water and caustic, exit by line 242 to the separation tank 244. The soaps gather at the top of the aqueous phase and may be removed to waste by line 246. The aqueous caustic solution which gathers at the bottom of tank 244 may be conducted by line 248 to the line 123 for use in the wash column 99.

The following example of the process of this invention is to be considered illustrative only and not limiting.

A cyclohexane air-oxidation procedure is conducted wherein about 11% of the cyclohexane fed to the reactor is oxidized to a series of products including cyclohexanol, cyclohexanone, adipic acid, water and other organic byproducts. About 1000 kilograms per hour of the reaction product mixture are passed through a heat exchanger which reduces the product temperature to about 70° C. with a partial release of pressure.

The mixture is passed to a quiescent settling zone from which about 12 kilograms of reaction water are removed per hour. 5 kilograms of adipic acid and 2 kilograms of other dicarboxylic acids besides monocarboxylic acids are dissolved in this aqueous phase. Substantially pure adipic acid crystallizes from this solution during cooling. The upper organic phase from the separator is washed out in a wash tower in countercurrent to a 3% sodium hydroxide solution at a temperature between 50 and 60° C., putting 15 kg./hr. of organic acids into the aqueous caustic as sodium salts. The washed reaction product has an acid number of about 0.1 and a practically nonmodified ester number. The 3% strength of the NaOH solution includes the dilution factor of water used in subsequent washing of the organic phase.

The spent, almost neutral, wash solution is drained from the bottom of the wash tower, heated in a heat exchanger to about 85° C. and freed of dissolved cyclohexane, cyclohexanone, and cyclohexanol in a distillation column, where the latter are topped as azeotropic mixtures with water, liquefied in a condenser and returned to the organic phase entering the wash tower.

The washed organic phase is heated to 75° C. in a heat exchanger and set to the falling film evaporator of a distillation column. In this column, 786 kilograms of cyclohexane with 2 kilograms of water dissolved therein are distilled off under reflux, liquefied in a heat exchanger and condenser, freed from water and passed back to the primary oxidation step.

The mixture draining from the bottom of the cyclohexane distillation column at a temperature between 110–120° C. consists of 99 kilograms of cyclohexane, 26 kilograms of cyclohexanone, 42 kilograms of cyclohexanol and 8 kilograms of esters and higher boiling impurities.

This mixture is freed of 99 kilograms of cyclohexane in a second distillation device, preferably a thin film rectifier, under a vacuum of 300 Torr. The distillate is refluxed to the previous (first) distillation column. Thus, cyclohexanone which might be entrained in the overhead cyclohexane is retained in the purification system.

The mixture of anolone and neutral byproducts is conducted to a falling film evaporator associated with a third distillation column, the top of which is maintained at a pressure of 15 Torr. An overhead mixture of 26 kg./hr. of cyclohexanone and 41.5 kg./hr. of cyclohexanol is removed from the system as product.

Some cyclohexanol and neutral byproducts (8 kg./hr.) accumulate at the bottom of this third distillation column. This material is sent, with water, to a cascade boiler. The boiling with water takes place in the upper section of the cascade, while 20% sodium hydroxide solution is fed to a midsection of this column. The free cyclohexanone and cyclohexanol are distilled off in the upper section of the equipment as azeotropic mixtures with water. In the lower section the esters saponify and the liberated cyclohexanol is distilled off as an azeotropic mixture with water.

The azeotropic vapors are precipitated in a condenser and the water-anolone mixture is returned to the quiescent settling zone. The caustic and saponified material gather at the bottom of the cascade and the mixture is withdrawn and permitted to settle. The soap layer is removed to waste, while the diluted caustic is sent to the previous wash tower for acid neutralization.

What is claimed is:

1. In a method for the recovery of cyclohexanol and cyclohexanone from a reaction product containing these components, water, cyclohexane byproduct acids and esters of cyclohexanol, the improvement which comprises separating the water of reaction containing the adipic acid from the organic phase, thereafter neutralizing the organic phase by treatment with a dilute aqueous caustic solution insufficient to cause saponification of esters, treating the neutral reaction product by distillation to remove therefrom cyclohexane; cyclohexanone and cyclohexanol and treating the remaining mixture with caustic in the substantial absence of cyclohexanone to saponify the said esters and recover therefrom additional cyclohexanol.

2. The method of claim 1 in which neutralization is performed with an aqueous caustic solution of less than about 10% caustic concentration at a temperature of about 50–100° C.

3. The method of claim 1 in which the saponification is performed with an aqueous caustic solution having a concentration greater than about 10% at a temperature of about 80–100° C.

4. The method of claim 3 in which caustic solution from the saponification reaction is treated to remove soap and sent to the neutralization procedure.

References Cited

UNITED STATES PATENTS

| | | |
|---|---|---|
| 3,316,302 | 4/1967 | Steeman et al. _____ 1—64 |
| 3,047,629 | 7/1962 | Steeman. |
| 2,703,331 | 3/1955 | Goldbeck. |

BERNARD HELFIN, *Primary Examiner.*

MATTHEW M. JACOB, *Assistant Examiner.*

U.S. Cl. X.R.

260—533, 631